(12) United States Patent
Ahn (10) Patent No.: US 12,534,051 B2
(45) Date of Patent: Jan. 27, 2026

(54) VEHICLE CONTROL DEVICE

(71) Applicant: TOYOTA JIDOSHA KABUSHIKI KAISHA, Toyota (JP)

(72) Inventor: Changjoo Ahn, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 18/751,672

(22) Filed: Jun. 24, 2024

(65) Prior Publication Data

US 2025/0091557 A1  Mar. 20, 2025

(30) Foreign Application Priority Data

Sep. 14, 2023  (JP) ................. 2023-149642

(51) Int. Cl.
  *B60T 8/32*  (2006.01)
  *B60T 8/17*  (2006.01)

(52) U.S. Cl.
  CPC . *B60T 8/32* (2013.01); *B60T 8/17* (2013.01)

(58) Field of Classification Search
  CPC . B60T 8/32; B60T 8/17; B60T 8/1755; B60T 8/17616; B60W 2555/20; B60W 50/0097
  See application file for complete search history.

(56) References Cited

U.S. PATENT DOCUMENTS

| 5,634,699 A | * | 6/1997 | Ichikawa | B60T 8/1769 303/190 |
| 2024/0317201 A1 | * | 9/2024 | Shibata | B60T 13/741 |

FOREIGN PATENT DOCUMENTS

| CN | 108501944 A | * | 9/2018 | ........... B60W 30/02 |
| CN | 114371691 A | * | 4/2022 | ........... G05D 1/0251 |
| CN | 219339205 U | * | 7/2023 | |
| JP | 2010-264915 A | | 11/2010 | |

OTHER PUBLICATIONS

Machine Translation of CN 219339205 U Pdf File Name: "CN219339205U_Machine_Translation.pdf" (Year: 2023).*
Machine Translation of CN 114371691 A Pdf File Name: "CN114371691A_Machine_Translation.pdf" (Year: 2022).*
Machine Translation of CN 108501944 A Pdf File Name: "CN 108501944A_Machine_Translation.pdf" (Year: 2018).*

* cited by examiner

*Primary Examiner* — Lindsay M Low
*Assistant Examiner* — Ruben Picon-Feliciano
(74) *Attorney, Agent, or Firm* — SoraIP, Inc.

(57) ABSTRACT

A vehicle control device that controls a motor and a braking force application device predicts a time waveform of a wheel speed when a required braking force based on a braking request is applied when a braking request is made while traveling on a winding road. The vehicle control device executes reduction control for controlling the braking force application device so that the reduced braking force is applied from the required braking force from the braking force application device in accordance with the timing of the variation of the wheel speed in the time waveform of the predicted wheel speed.

3 Claims, 4 Drawing Sheets

VEHICLE CONTROL DEVICE

CROSS-REFERENCE TO RELATED APPLICATION

This application claims priority to Japanese Patent Application No. 2023-149642 filed on Sep. 14, 2023, incorporated herein by reference in its entirety.

BACKGROUND

1. Technical Field

The present disclosure relates to a vehicle control device.

2. Description of Related Art

Hitherto, as a vehicle control device of this type, there has been proposed a vehicle control device that is used for a vehicle including a motor and a braking force application device (brake) and controls the brake (see, for example, Japanese Unexamined Patent Application Publication No. 2010-264915 (JP 2010-264915 A)). In this vehicle, the motor outputs power to a drive shaft. In this vehicle, the braking force application device is a hydraulic braking force application device configured to apply a braking force to a wheel connected to the drive shaft via an axle. In this device, when sudden braking is required while the vehicle is traveling on a winding road, the braking force application device is controlled so that the brake hydraulic pressure is equal to or lower than a threshold value. Thus, torque variation of the axle and the drive shaft is suppressed.

SUMMARY

In the above control device, the torque variation of the axle and the drive shaft is suppressed, but the deceleration of the vehicle may be suppressed because the brake hydraulic pressure is set equal to or lower than the threshold value.

A main object of the vehicle control device of the present disclosure is to suppress torque variation of an axle and a drive shaft and to decelerate a vehicle more In order to achieve the above main object, the vehicle control device of the present disclosure adopts the following measures.

The vehicle control device of the present disclosure is used for a vehicle including a motor configured to output power to a drive shaft, and a braking force application device configured to apply a braking force to a wheel connected to the drive shaft via an axle. The vehicle control device of the present disclosure is configured to control the motor and the braking force application device. The vehicle control device of the present disclosure is configured to, when a braking request is made during traveling on a winding road, predict a temporal waveform of a wheel speed while a requested braking force based on the braking request is applied. The vehicle control device of the present disclosure is configured to execute reduction control for controlling the braking force application device to apply a braking force reduced from the requested braking force in synchronization with a timing of variation in the wheel speed in the predicted temporal waveform of the wheel speed.

The vehicle control device of the present disclosure is configured to, when the braking request is made during the traveling on the winding road, predict the temporal waveform of the wheel speed while the requested braking force based on the braking request is applied. The vehicle control device of the present disclosure is further configured to execute the reduction control for controlling the braking force application device to apply the braking force reduced from the requested braking force in synchronization with the timing of variation in the wheel speed in the predicted temporal waveform of the wheel speed. If a constant braking force is applied to the wheel when the vehicle jumps on a winding road and the wheel idles, that is, when variation occurs in the wheel speed, torque variation occurs in the axle and the drive shaft. Therefore, the braking force to be applied from the braking force application device to the wheel is reduced from the requested braking force in synchronization with the variation in the wheel speed. Thus, it is possible to suppress the torque variation of the axle and the drive shaft as compared with the case where a constant relatively large braking force is applied regardless of the variation in the wheel speed. In addition, the vehicle can be decelerated more quickly than in the case where a constant relatively small braking force is applied regardless of the variation in the wheel speed. As a result, the torque variation of the axle and the drive shaft can be suppressed and the vehicle can be decelerated more appropriately.

In the vehicle control device of the present disclosure, the braking request may be a request for sudden braking, and the vehicle control device may be configured to predict a temporal waveform until the vehicle is to be stopped as the temporal waveform of the wheel speed. In this way, when sudden braking is requested, the torque variation of the axle and the drive shaft can be suppressed in accordance with the temporal waveform until the vehicle is to be stopped.

In the vehicle control device of the present disclosure, the vehicle control device may be configured to predict a stop timing when the vehicle is to be stopped based on the temporal waveform of the wheel speed. The vehicle control device may be configured to, when a variation range of the wheel speed reaches a predetermined low variation state during execution of the reduction control, terminate the execution of the reduction control and control the braking force application device to stop the vehicle at the predicted stop timing. Accordingly, the vehicle can be stopped at the predicted stop timing, and an increase in the braking distance can be suppressed.

In the vehicle control device of the present disclosure, the reduction control may be controlling the braking force application device to reduce the braking force to be applied from the braking force application device once every two times of variation in the wheel speed in the predicted temporal waveform of the wheel speed. Thus, the torque variation of the axle and the drive shaft can be suppressed while the braking force applied to the wheel is kept to some extent.

In the vehicle control device of the present disclosure, the vehicle control device may be configured to generate, by machine learning, a model of the temporal waveform of the wheel speed when the braking request is made during the traveling on the winding road. The vehicle control device may be configured to, when the braking request is made during the traveling on the winding road, predict the temporal waveform of the wheel speed by using the model. By predicting the temporal waveform of the wheel speed using the model generated by the machine learning, the accuracy of prediction of the temporal waveform of the wheel speed is improved. Since the reduction control is executed by using the accurately predicted temporal waveform of the wheel speed, the torque variation of the axle and the drive shaft can be suppressed and the vehicle can be decelerated more

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
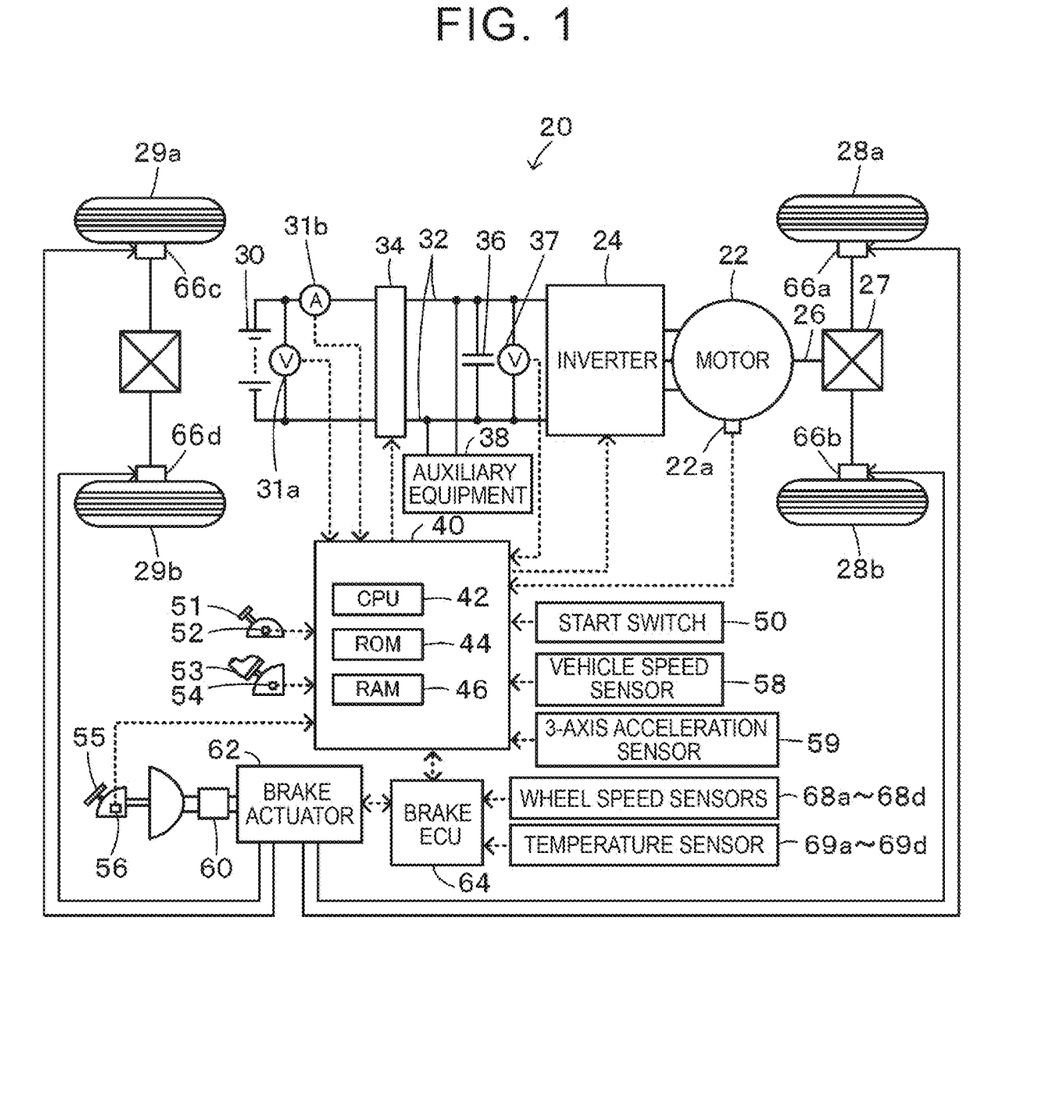
FIG. 1 is a configuration diagram illustrating an outline of a configuration of a battery electric vehicle 20 in which a vehicle control device according to an embodiment of the present disclosure is mounted.

Embodiments of the present disclosure will be described with reference to the drawings. FIG. 1 is a configuration diagram schematically showing a configuration of a battery electric vehicle 20 in which a vehicle control device according to an embodiment of the present disclosure is mounted. Battery electric vehicle 20 of the embodiment includes, as shown, a motor 22, an inverter 24, a battery 30, a system main relay 34, an electronic control unit 40, and a brake actuator (braking force application device) 62.

The motor 22 is configured as a synchronous generator motor, and includes a rotor in which a permanent magnet is embedded, and a stator in which a three-phase coil is wound. The rotor of the motor 22 is connected to a drive shaft 26 connected to drive wheels 28a, 28b via a differential gear 27.

Inverter 24 is connected to motor 22 and to power line 32. The inverter 24 is configured as a known inverter circuit having six transistors and six diodes.

The battery 30 is configured as, for example, a lithium-ion secondary battery or a nickel-hydrogen secondary battery, and is connected to the power line 32. A system main relay 34 is attached to the power line 32. Although not shown, the system main relay 34 includes a positive-electrode-side relay provided on the positive-electrode bus of the power line 32, a negative-electrode-side relay provided on the negative-electrode bus of the power line 32, and a precharge circuit. The precharge circuit is a circuit in which a precharge resistor and a precharge relay are connected in series so as to bypass the negative-side relay. A smoothing capacitor 36 and an auxiliary machine (not shown) are also connected to the power line 32.

The electronic control unit 40 is configured as a microprocessor centered on CPU 42. In addition to CPU 42, the electronic control unit 40 includes a ROM 44 for storing a process program, RAM 46 for temporarily storing data, a flash memory (not shown), an input/output port (not shown), a communication port (not shown), and the like.

Signals from various sensors are input to the electronic control unit 40 via input ports. Examples of the signals inputted to the electronic control unit 40 include a rotational position $\theta m$ from a rotational position detecting sensor (for example, a resolver) 22a that detects the rotational position of the rotor of the motor 22, and a current IB from a current sensor 31b attached to an output terminal of the voltage VB, battery 30 from a voltage sensor 31a attached between terminals of the battery 30. The voltage Vin of the capacitor 36 (power line 32) from the voltage sensor 37 mounted between the terminals of the capacitor 36 may also be mentioned. Further, there may be mentioned a start signal from the start switch 50, an accelerator operation amount from the accelerator pedal position sensor 54 for detecting a depression amount of the shift position SP, accelerator pedal 53 from the shift position sensor 52 for detecting an operation position of the shift lever 51, a brake pedal position from the brake pedal position sensor 56 for detecting a depression amount of the brake pedal 55, a vehicle speed V from the vehicle speed sensor 58, a three-axis acceleration $\alpha$ from the three-axis acceleration sensor 59 for detecting an acceleration in the horizontal direction, the front-rear direction, and the vertical direction, and the like.

Various control signals are output from the electronic control unit 40 via an output port. Examples of the signal output from the electronic control unit 40 include a switching control signal to the transistor of the inverter 24, a drive control signal to the system main relay 34, and the like.

The electronic control unit 40 calculates the rotational speed Nm of the motor 22 based on the rotational position $\theta m$ from the rotational position detecting sensor 22a. Further, the electronic control unit 40 calculates the motor torque Tm as the torque outputted from the motor 22 based on the current flowing through the three-phase coil of the motor 22 detected by a current sensor (not shown). The electronic control unit 40 calculates the pitch angle $\theta p$ based on the three-axis acceleration $\alpha$ from the three-axis acceleration sensor 59. The electronic control unit 40 calculates the grounding load Lv and the front-rear load Ll of the tire on the basis of the weight of the vehicle, the length of the wheel base, the height of the center of gravity, the acceleration toward the traveling direction of the vehicle, and the like.

The brake actuator 62 is configured such that the hydraulic pressure of 66d pistons can be adjusted from the disc brake 66a so that the braking force corresponding to the sharing of brakes in the braking force applied to the vehicle acts on the driven wheels 29a, 29b and the drive wheels 28a, 28b by the pressure (brake hydraulic pressure) Pboil of the brake master cylinder 60 generated in response to the depression of the brake pedal 55 and the vehicle speed V. Furthermore, the brake actuator 62 is configured to adjust the hydraulic pressure of 66d pistons from the disc brake 66a so that a braking force acts on the driven wheels 29a, 29b and the drive wheels 28a, 28b regardless of the depression of the brake pedal 55. The brake hydraulic Pboil is detected by a hydraulic sensor (not shown) that detects the pressure (brake hydraulic pressure) of the brake master cylinder 60. Hereinafter, the braking force applied to the driven wheels 29a, 29b and the drive wheels 28a, 28b by the operation of the brake actuator 62 may be referred to as a hydraulic brake. The brake actuator 62 is controlled by a brake electronic control unit (hereinafter referred to as a brake ECU) 64. The brake ECU 64 is in communication with the electronic control unit 40, and drives and controls the brake actuator 62 according to a control signal from the electronic control unit 40, and outputs, to the electronic control unit 40, data related to the status of the brake actuator 62, such as a brake hydraulic Pboil, as needed.

The brake ECU 64 receives, from the driven wheels 29a, 29b and the wheel speed sensors 68a to 68d attached to the drive wheels 28a, 28b, wheel speeds Vdr, Vdl, Vnr, Vnl, a steering angle from a steering angle sensor (not shown), and the like Tbpd from a brake pad temperature Tbpa from 69d from a temperature sensor 69a that detects the temperature of the brake pad of 66d from the disc brake 66a.

The brake ECU 64 calculates the braking torque to be applied to the drive wheels 28a, 28b and the driven wheels 29a, 29b in accordance with the depression amount of the brake pedal 55 when the driver depresses the brake pedal 55. The brake ECU 64 divides the braking torque to be applied to the drive wheels 28a, 28b and the driven wheels 29a, 29b from the disc brake 66a to the braking torque by 66d and the braking torque by the regenerative control of the motor 22. Then, the brake actuator 62 is driven and controlled so that a braking torque (required braking force) Tb*, which is to be applied from the disc brake 66a to 66d, acts. The braking torque Tbm* by the regenerative control of the motor 22 is transmitted to the electronic control unit 40. The electronic control unit 40 that has received the braking torque Tbm* performs switching control of the switching elements of the inverter 24 so that the braking torque to be output from the motor 22 is output.

Further, the brake ECU 64 inputs the wheel speeds Vdr, Vdl, Vnr, Vnl from the wheel speed sensors 68a to 68d every predetermined time (for example, every few msec), and calculates an integrated value Sdv of the variation amounts ΔVdr, ΔVdl, ΔVnr, ΔVnl and the variation amounts ΔVdr, ΔVdl, ΔVnr, ΔVnl from the wheel speeds Vdr, Vdl, Vnr, Vnl from the time when the wheel speed is input last time, and the mean values (=(ΔVdr+ΔVdl+ΔVnr+ΔVnl)/4) of the variation amounts ΔVdr, ΔVdl, ΔVnr, ΔVnl, ΔVnl. Then, when the integrated value Sdv becomes equal to or larger than the threshold Sdref1, it is determined that the road surface is a winding road, and the winding road flag F is set to the value 1. When the integrated value Sdv becomes less than the threshold Sdref1, it is determined that the road surface is not a winding road, and the winding road flag F is set to the value 0.

Next, the operation of battery electric vehicle 20 of the embodiment configured in this way, in particular, the operation when the travel is requested while traveling on the winding road will be described. First, the machine-learning performed in advance in battery electric vehicle 20 (e.g., by driving battery electric vehicle 20 on a test-course or chassis dynamometer prior to shipping of battery electric vehicle 20) will be described, followed by the operation during running.

Figure 2:
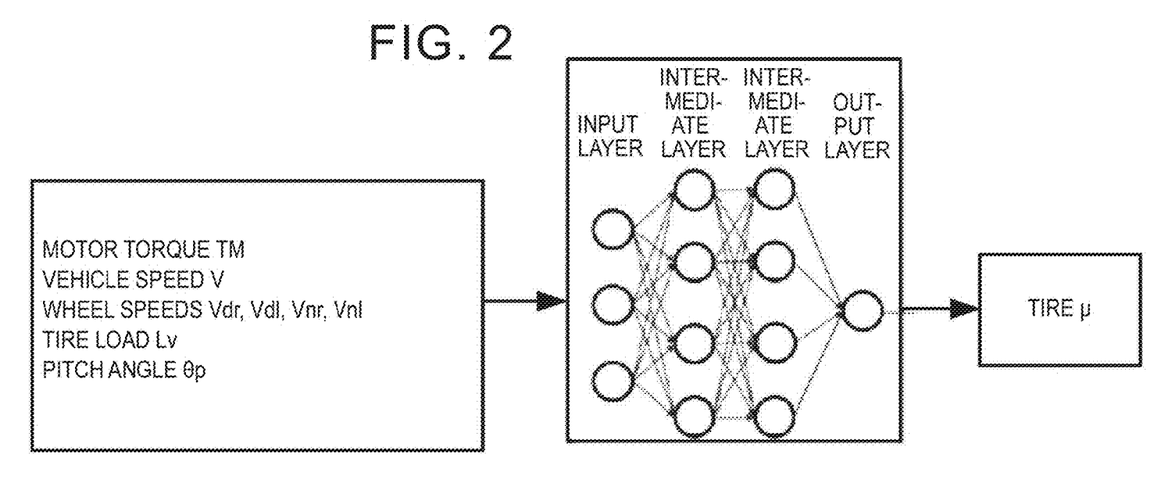
FIG. 2 is an explanatory view showing an example of signs that machine learning model M1 is created with machine learning.

FIG. 2 is an explanatory diagram illustrating an exemplary manner in which machine learning model M1 is created by machine learning. In battery electric vehicle 20 of the embodiment, the electronic control unit 40 creates a machine learning model M1 by machine learning in advance and stores it in ROM 44 of the electronic control unit 40. The machine learning model M1 is a model in which the motor torque Tm, the vehicle speed V, the wheel speeds Vdr, Vdl, Vnr, Vnl, the grounding load Lv, and the pitch angle θp are set as input data, and the frictional coefficient μ (tire μ) between the tire and the road surface is set as output data. Here, the vehicle speed V is detected by the vehicle speed sensor 58, and the wheel speeds Vdr, Vdl, Vnr, Vnl are detected by the wheel speed sensors 68a to 68d. The motor torque Tm, the grounding load Lv, and the pitch angle θp are calculated by the electronic control unit 40. The tire μ is calculated in advance as the road surface of the test course, the ground contact surface of the chassis dynamo, and the friction coefficient of the tire.

Figure 3:
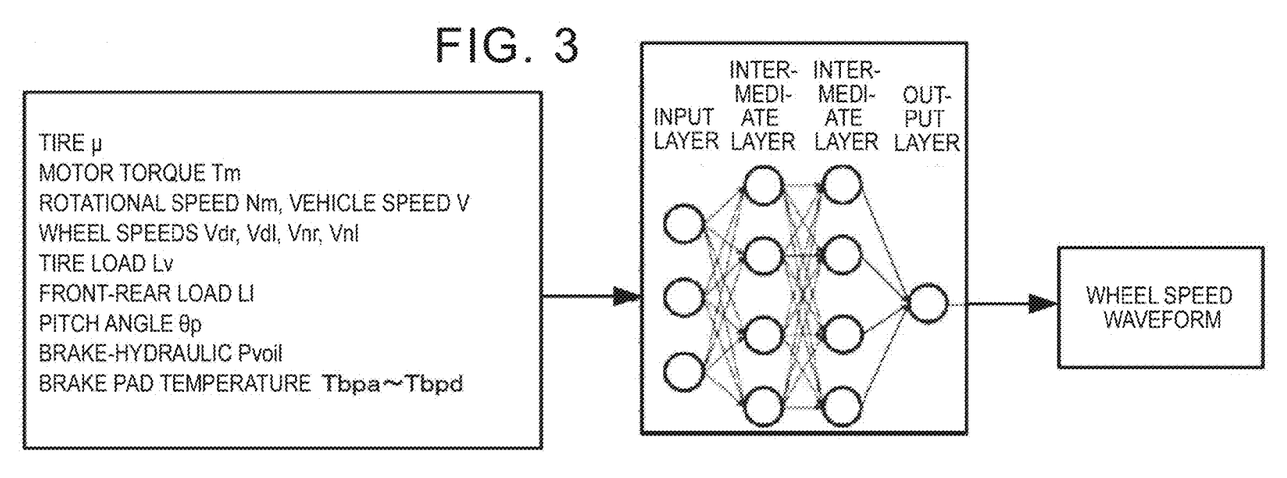
FIG. 3 is an explanatory view illustrating an exemplary state of creating machine learning model M2 by machine learning.

FIG. 3 is an explanatory diagram illustrating an exemplary manner in which machine learning model M2 is created by machine learning. In battery electric vehicle 20 of the embodiment, the electronic control unit 40 creates a machine learning model M2 by machine learning in advance and stores it in ROM 44 of the electronic control unit 40. The machine learning model M2 is a model in which the tire μ, the motor torque Tm, the rotational speed Nm, the vehicle speed V, the wheel speeds Vdr, Vdl, Vnr, Vnl, the grounding load Lv, the front-rear load Ll, the pitch angle θp, the brake hydraulic pressure Pboil, and the brake pad temperature Tbpa to Tbpd are input data, and the time waveform of the mean wheel speeds Vdr, Vdl, Vnr, Vnl (hereinafter, referred to as "wheel speed Vw") in a period from when the predetermined sudden braking is performed until the battery electric vehicle 20 stops is output data, when the sudden braking is requested and the braking torque is applied to the drive wheels 28a, 28b and the driven wheels 29a, 29b. Here, the vehicle speed V is detected by the vehicle speed sensor 58, and the wheel speeds Vdr, Vdl, Vnr, Vnl are detected by the wheel speed sensors 68a to 68d respectively. The brake hydraulic Pboil is detected by a hydraulic sensor (not shown), and Tbpd from the brake pad temperature Tbpa is detected by a 69d from the temperature sensor 60a and is inputted via a brake ECU 64. The motor torque Tm, the rotational speed Nm, the grounding load Lv, the front-rear load Ll, and the pitch angle θp are calculated by the electronic control unit 40. The tire μ is calculated in advance as the road surface of the test course, the ground contact surface of the chassis dynamo, and the friction coefficient of the tire. The sudden braking may be requested when Kpboil of inclination of the brake hydraulic pressure Pboil with respect to the temporal variation exceeds a predetermined dpref.

Figure 4:
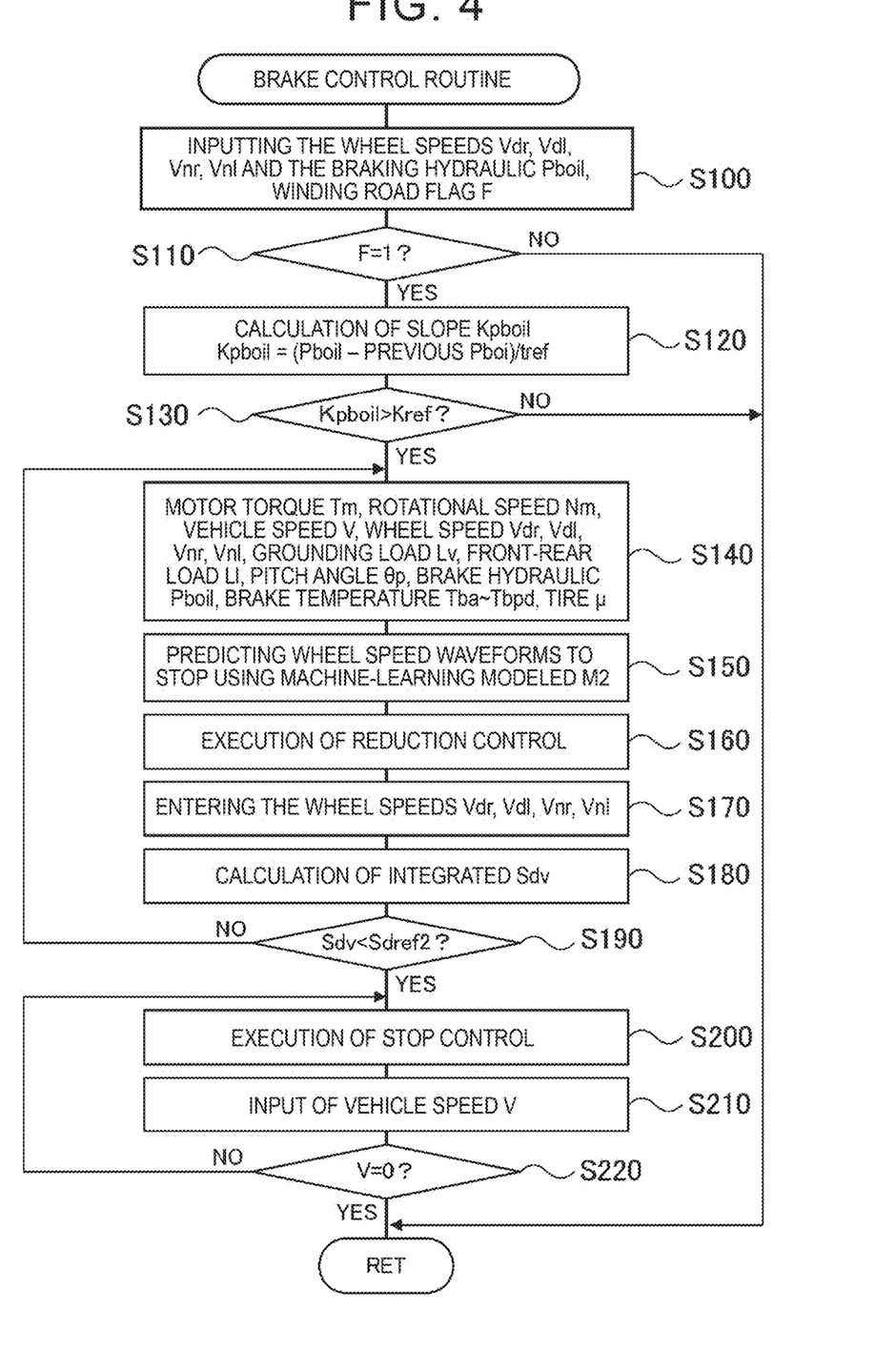
FIG. 4 is a flow chart which shows an example of the brake control routine performed by the electronic control unit 40.

Next, an operation when battery electric vehicle 20 of the embodiment is traveling on a winding road will be described. FIG. 4 is a flowchart illustrating an example of a brake control routine executed by the electronic control unit 40. This routine is executed during traveling.

When this routine is executed, CPU 42 of the electronic control unit 40 executes a process of inputting the wheel speeds Vdr, Vdl, Vnr, Vnl, the brake hydraulic pressure Pboil, and the winding road flag F (S100). The wheel speeds Vdr, Vdl, Vnr, Vnl are detected by the wheel speed sensors 68a to 68d. A brake hydraulic Pboil detected by a hydraulic sensor (not shown) is inputted via a brake ECU 64.

When data required for the processing including the tire μ predicted in this way is inputted, it is determined whether or not the winding road flag F is equal to 1 (S110). When the winding road flag F has a value of 0, it is determined that the vehicle is not traveling on the winding road, and the present routine is ended.

When the winding road flag F is 1 in S110, the slope Kpboil of the braking hydraulic Pboil with respect to time is calculated using the following equation (1) (S120). In Expression (1), "previous Pboil" is a braking hydraulic Pboil inputted when the previous S100 or S140 is executed. The time tref is an elapsed time since the previous S100 or S140 was executed.

$$Kpboil = (Pboil - \text{previous } Pboil)/tref \tag{1}$$

Subsequently, it is determined whether or not the slope Kpboil exceeds the threshold Kref (S130). The threshold value Kref is a threshold value for determining whether or not the braking hydraulic pressure Pboil has abruptly changed in a short time. The brake hydraulic Pboil is generated in response to depression of the brake pedal 55. Therefore, S130 is a process of determining whether or not the brake pedal 55 has been suddenly depressed in a short time, that is, whether or not sudden braking is requested. When the slope Kpboil does not exceed the threshold Kref, the routine ends.

When the inclination Kpboil exceeds the threshold Kref in S130, it is determined that the sudden braking is requested, and a process of inputting Tbpd and the tire μ from the motor torque Tm, the rotational speed Nm, the vehicle speed V, the wheel speeds Vdr, Vdl, Vnr, Vnl, the grounding load Lv, the front-rear load Ll, the pitch angle θp, the brake hydraulic pressure Pboil, and the brake pad temperature Tbpa is executed (S140). The vehicle speed V is detected by the vehicle speed sensor 58, and the wheel speeds Vdr, Vdl, Vnr, Vnl are detected by the wheel speed sensors 68a to 68d respectively. The brake hydraulic Pboil is detected by a hydraulic sensor (not shown), and Tbpd from the brake pad temperature Tbpa is detected by a 69d from the temperature sensor 60a and is inputted via a brake ECU 64. The motor torque Tm, the rotational speed Nm, the grounding load Lv, the front-rear load Ll, and the pitch angle θp are calculated by the electronic control unit 40. The tire μ is predicted using the machine-learning-model M1 and is inputted from RAM 46.

Figure 5:
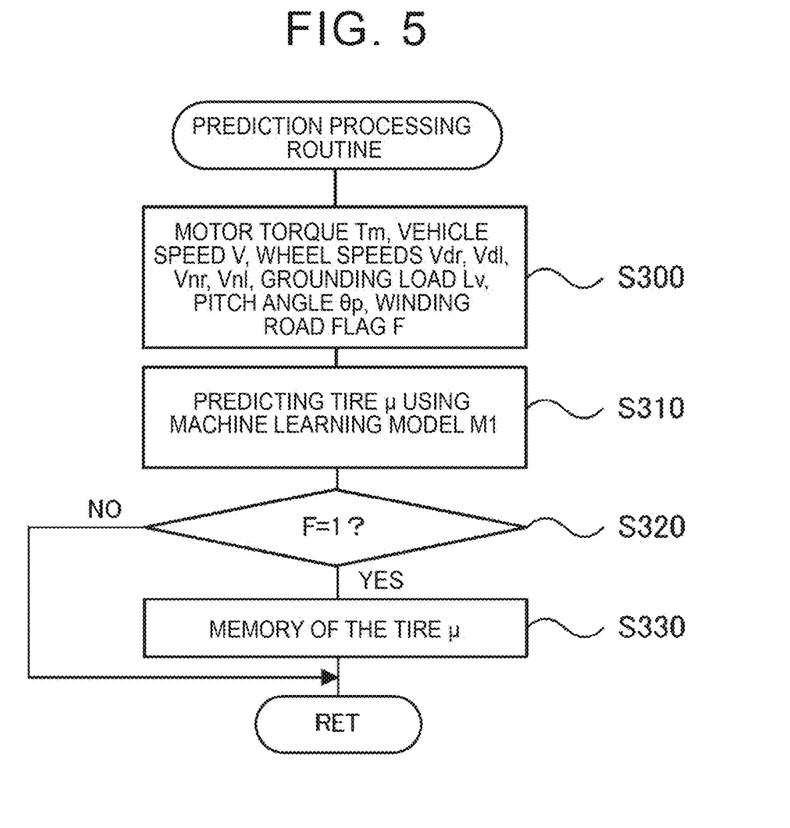
FIG. 5 is a flow chart illustrating an exemplary predictive routine executed by the electronic control unit 40.

Here, prediction of the tire μ will be described. FIG. 5 is a flowchart illustrating an example of a prediction processing routine executed by the electronic control unit 40. This routine is repeatedly executed during traveling.

When this routine is executed, CPU 42 of the electronic control unit 40 receives the motor torque Tm, the vehicle speed V, the wheel speeds Vdr, Vdl, Vnr, Vnl, the grounding load Lv, the pitch angle θp, and the winding road flag F (S300). The vehicle speed V is detected by the vehicle speed sensor 58, and the wheel speeds Vdr, Vdl, Vnr, Vnl are detected by the wheel speed sensors 68a to 68d. The motor torque Tm, the grounding load Lv, and the pitch angle θp are input that is calculated by the electronic control unit 40. As described above, the winding road flag F is set based on the wheel speeds Vdr, Vdl, Vnr, Vnl from the wheel speed sensors 68a to 68d.

Subsequently, the tire μ is predicted using the machine learning model M1 using the motor torque Tm, the vehicle speed V, the wheel speeds Vdr, Vdl, Vnr, Vnl, the grounding load Lv, and the pitch angle θp as input data (S310), and it is determined whether or not the winding road flag F is a value 1 (S320). When the winding road flag F is not the value 1, the present routine is terminated, and when the winding road flag F is the value 1, the predicted tire μ is stored in RAM 46 (S330), and the present routine is terminated.

Figure 6:
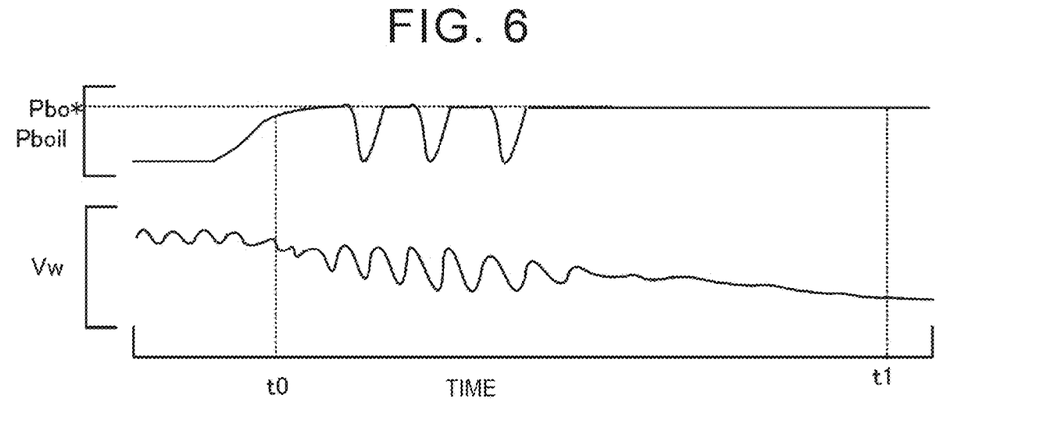
FIG. 6 is an explanatory diagram illustrating an exemplary temporal change in the braking hydraulic Pboil and the wheel speed Vw.

Subsequently, the time-waveform of the wheel speed Vw from the present time to the stop of the battery electric vehicle 20 is predicted using the machine learning model M2 using the data input in S140, that is, the tire μ, the motor torque Tm, the rotational speed Nm, the vehicle speed V, the wheel speeds Vdr, Vdl, Vnr, Vnl, the grounding load Lv, the front-rear load Ll, the pitch angle θp, the brake hydraulic pressure Pboil, and the brake pad temperature Tbpa to Tbpd as input data (S150). FIG. 6 is an explanatory diagram illustrating an exemplary temporal change in the braking hydraulic Pboil and the wheel speed Vw. The temporal t0 is a timing at which it is determined in S130 that the slope Kpboil exceeds the threshold Kref. The time t1 is a timing at which the vehicles stop. In S150, a process of predicting a temporal change (temporal wave form) of the wheel speed Vw from the temporal t0 to the temporal t1 in FIG. 6 is performed. Now, since the vehicle is traveling on a winding road, the vehicle jumps on the winding road, and the drive wheels 28a, 28b and the driven wheels 29a, 29 idle, and the rotational speed of the drive wheels 28a, 28b and the driven wheels 29a, 29 decreases when the vehicle is touched, so that the wheel speed Vw periodically fluctuates (increases or decreases).

Then, at a timing corresponding to the variation of the wheel speed Vw in the temporal waveform of the wheel speed Vw, a reduction control is executed to adjust the brake hydraulic pressure by controlling the brake actuator 62 so that the brake torque reduced from the braking torque Tb* to be acted from the disc brake 66a to 66d to the drive wheels 28a, 28b and the driven wheels 29a, 29b to act on the drive wheels 28a, 28b and the driven wheels 29a, 29b at a rate of once every time the wheel speed Vw changes twice (S160). With such control, as shown in FIG. 6, at a rate of once every time the wheel speed Vw changes twice, the brake hydraulic pressure Pboil decreases from the brake hydraulic pressure Pbo* corresponding to the braking torque Tb* at a timing at which the wheel speed Vw decreases, and returns to the brake hydraulic pressure Pbo* at a timing at which the wheel speed Vw increases. Thus, the torque fluctuation of the axle and the drive shaft 26 can be suppressed as compared with the case where the constant braking torque Tb* is applied from the disc brake 66a to 66d to the drive wheels 28a, 28b and the driven wheels 29a, 29b without changing the wheel speed Vw. In addition, the vehicle can be decelerated more quickly than when the braking torque smaller than the constant braking torque Tb* is applied from the disc brake 66a to 66d to the drive wheels 28a, 28b and the driven wheels 29a, 29b regardless of the variation of the wheel speed Vw. Therefore, the torque fluctuation of the axle and the drive shaft 26 can be suppressed, and the vehicle can be decelerated more appropriately.

Subsequently, the wheel speeds Vdr, Vdl, Vnr, Vnl is inputted in the same process as in S100, S140 (S170), and the integrated value Sdv of the variation amounts ΔVdr, ΔVdl, ΔVnr, ΔVnl and the variation amounts ΔVdr, ΔVdl, ΔVnr, ΔVnl from the wheel speeds Vdr, Vdl, Vnr, Vnl inputted in S100 and S140 executed last time (=(ΔVdr+ΔVdl+ΔVnr+ΔVnl)/4) is calculated (S180), and it is determined whether or not the integrated value Sdv is less than the threshold Sdref2 (S190). The threshold value Sdref2 is a threshold value for determining whether or not a predetermined low-variation condition in which the variation range of the wheel speed Vw can be regarded as sufficiently low is present. When the integrated value Sdv is equal to or larger than the threshold value Sdref2, it is determined that the variation range of the wheel speed Vw is not sufficiently small, and the process returns to S140, and S190 is repeated from S140 until the integrated value Sdv becomes less than the threshold value Sdref2.

Then, when the integrated-value Sdv becomes less than the threshold Sdref2, stop control is executed to control the brake actuator 62 so that the vehicle stops at the time t1 at which battery electric vehicle 20 stops in the wave form of the wheel speed Vw predicted by S150 (S200). Further, the vehicle speed V is inputted in the same process as in S140 (S210), and it is determined whether or not the vehicle speed V is 0 (S220). When the vehicle speed V is not 0, that is, when battery electric vehicle 20 is not stopped, S220 is repeated from S200 until battery electric vehicle 20 stops.

When battery electric vehicle 20 stops, the routine ends. Accordingly, battery electric vehicle 20 can be stopped at the time t1 as the predicted stop timing, and the increase in the braking distance can be suppressed.

According to the above-described battery electric vehicle 20 of mounting the vehicle control device of the present embodiment, when a braking demand is made while traveling on a winding road, the temporal waveform of the wheel speed Vw from the current time point to the stop of battery electric vehicle 20 is predicted using the machine-learning-model M2. Further, it is possible to suppress the torque fluctuation of the axle and the drive shaft 26 and to further appropriately decelerate the battery electric vehicle 20 by executing the reduction control for adjusting the brake hydraulic pressure by controlling the brake actuator 62 so that the braking torque reduced from the disc brake 66a to 66d to the drive wheels 28a, 28b and the braking torque Tb* to be applied to the driven wheels 29a, 29b acts on the drive wheels 28a, 28b and the driven wheels 29a, 29b in accordance with the timing corresponding to the fluctuation of the wheel speed Vw in the time-waveform of the wheel speed Vw.

Further, the time t1 (stop timing) at which battery electric vehicle 20 stops based on the time waveform of the wheel speed Vw is predicted, and when the integrated value Sdv becomes less than the threshold Sdref2 during the execution of the reduction control, the execution of the reduction control is terminated, since the stop control for controlling the brake actuator 62 so that the vehicle stops at the time to, it is possible to stop the vehicle at a time t1 as the predicted stop timing, it is possible to suppress the increase of the braking distance.

In addition, in the reduction control, at a rate of one time every time that the wheel speed Vw changes twice, the braking torque reduced from the braking torque Tb* to be applied from the disc brake 66a to 66d to the drive wheels 28a, 28b or the driven wheels 29a, 29b is controlled by the brake actuator 62 to act on the drive wheels 28a, 28b or the driven wheels 29a, 29b, so that the braking force applied to the drive wheels 28a, 28b or the driven wheels 29a, 29b can be controlled to some extent while suppressing the movement of the axle or the drive shaft 26.

Then, the machine learning model M2 is generated as a model of the time waveform of the wheel speed Vw when a braking request is made while traveling on the winding road by machine learning, and the time waveform of the wheel speed Vw is predicted using the machine learning model M2 when a braking request is made while traveling on the winding road, so that the torque variation of the axle and the drive shaft 26 can be suppressed more appropriately and battery electric vehicle 20 can be decelerated.

In the above-described embodiment, in the reduction control, the braking torque reduced from the braking torque Tb* to be applied from the disc brake 66a to 66d to the drive wheels 28a, 28b and the driven wheels 29a, 29b is applied to the drive wheels 28a, 28b and the driven wheels 29a, 29b at a rate of once every time the wheel speed Vw varies twice. However, the braking torque reduced from the braking torque Tb* to be applied from the disc brake 66a to 66d to the drive wheels 28a, 28b and the driven wheels 29a, 29b may be applied to the drive wheels 28a, 28b and the driven wheels 29a, 29b at a rate of once every time the wheel speed Vw changes three times or at a rate of once every time the wheel speed Vw changes four times.

In the above-described embodiment, the braking request is a request for sudden braking. However, the braking request may be a braking request in which the braking request is lower than the sudden braking.

In the above-described embodiment, the machine learning model M2 is generated as a model of the time waveform of the wheel speed Vw when a braking request is made while traveling on the winding road by machine learning, and the time waveform of the wheel speed Vw is predicted using the machine learning model M2 when a braking request is made while traveling on the winding road. However, the temporal waveform of the wheel speed Vw may be predicted by a method other than machine-learning.

The correspondence between the main elements of the embodiments and the main elements of the disclosure described in the column of the means for solving the problem will be described. In the embodiment, the electronic control unit 40 and the brake ECU 64 correspond to a "vehicle control device".

Note that the correspondence between the main elements of the embodiment and the main elements of the disclosure described in the section of the means for solving the problem is an example for specifically explaining the embodiment of the disclosure described in the section of the means for solving the problem, and therefore the elements of the disclosure described in the section of the means for solving the problem are not limited. That is, the interpretation of the disclosure described in the section of the means for solving the problem should be performed based on the description in the section, and the embodiments are only specific examples of the disclosure described in the section of the means for solving the problem.

Although the embodiments for carrying out the present disclosure have been described above, the present disclosure is not limited to such embodiments at all, and it is needless to say that the present disclosure can be carried out in various forms without departing from the gist of the present disclosure.

The present disclosure is applicable to a manufacturing industry of a vehicle control device, and the like.

What is claimed is:

1. A vehicle control device to be used for a vehicle including a motor configured to output power to a drive shaft, and a hydraulic brake actuator that adjusts wheel-cylinder hydraulic pressure under control of a brake electronic control unit (brake ECU), the hydraulic brake actuator configured to apply a braking force to a wheel connected to the drive shaft via an axle, the vehicle control device being configured to control the motor and the brake ECU, wherein:

the vehicle control device is configured to, when a braking request for sudden braking is made during traveling on a winding road, predict a temporal waveform of a wheel speed until the vehicle is to be stopped while a requested braking force based on the braking request is applied;

the vehicle control device is configured to execute reduction control for controlling the hydraulic brake actuator to apply a braking force reduced from the requested braking force in synchronization with a timing of variation in the wheel speed in the predicted temporal waveform of the wheel speed;

the vehicle control device is configured to predict a stop timing when the vehicle is to be stopped based on the temporal waveform of the wheel speed; and the vehicle control device is configured to, when a variation range of the wheel speed reaches a predetermined low variation state during execution of the reduction control, terminate the execution of the reduction control and control the hydraulic brake actuator to stop the vehicle at the predicted stop timing.

2. The vehicle control device according to claim 1, wherein the reduction control is controlling the braking force application device to reduce the braking force to be applied from the braking force application device once every two times of variation in the wheel speed in the predicted temporal waveform of the wheel speed.

3. The vehicle control device according to claim 1, wherein:
   the vehicle control device is configured to generate, by machine learning, a model of the temporal waveform of the wheel speed when the braking request is made during the traveling on the winding road; and
   the vehicle control device is configured to, when the braking request is made during the traveling on the winding road, predict the temporal waveform of the wheel speed by using the model.

* * * * *